UNITED STATES PATENT OFFICE.

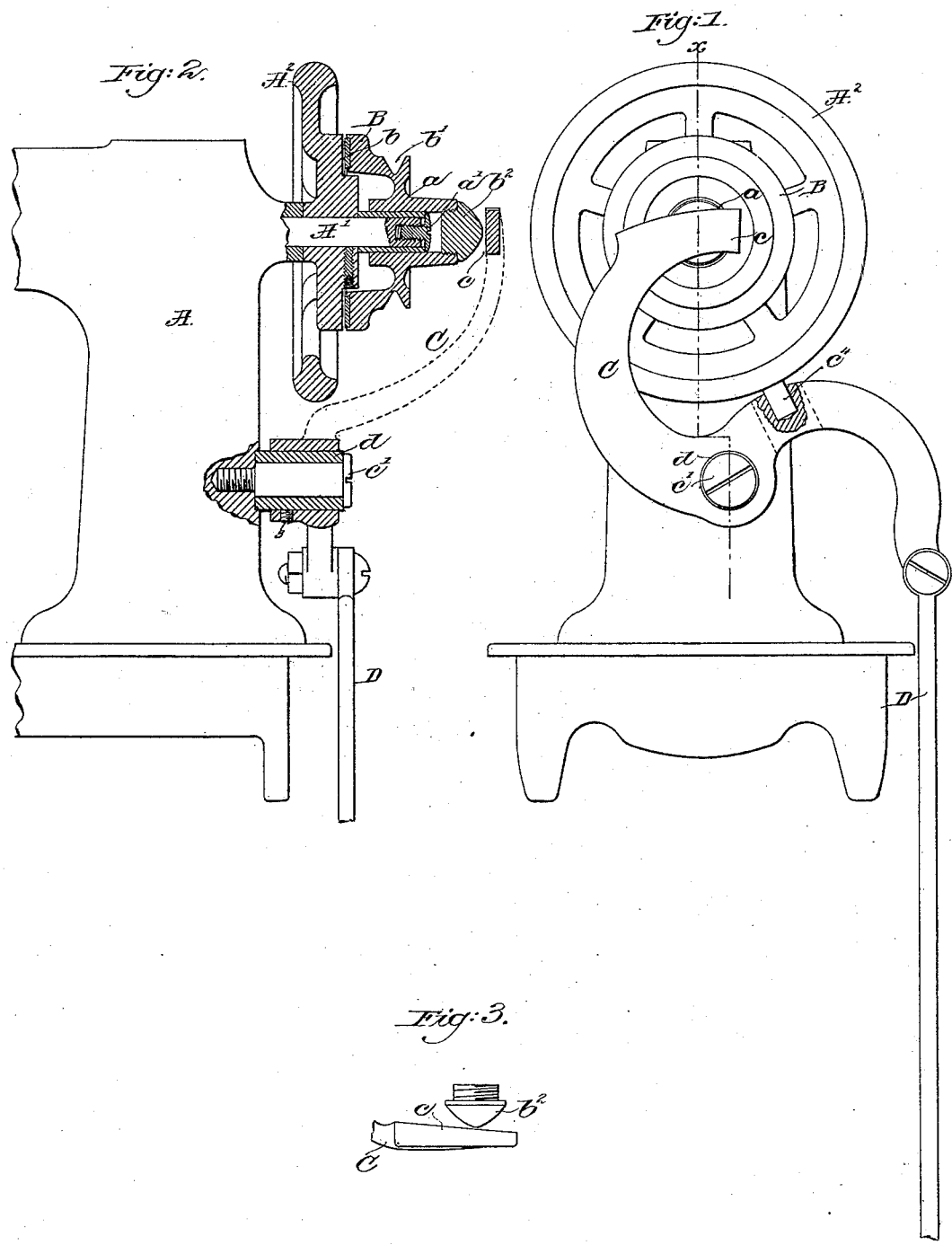

WILBUR F. DIAL, OF BRIDGEPORT, CONNECTICUT, ASSIGNOR TO THE WHEELER & WILSON MANUFACTURING COMPANY, OF SAME PLACE.

DRIVING APPARATUS AND BRAKE FOR SEWING-MACHINES.

SPECIFICATION forming part of Letters Patent No. 391,694, dated October 23, 1888.

Application filed June 25, 1888. Serial No. 278,193. (No model.)

*To all whom it may concern:*

Be it known that I, WILBUR F. DIAL, of Bridgeport, county of Fairfield, State of Connecticut, have invented an Improvement in Driving Apparatus and Brakes for Sewing-Machines, of which the following description, taken in connection with the accompanying drawings, is a specification, like letters on the drawings representing like parts.

This invention in sewing-machines has for its object to provide an improved driving and brake attachment for power-driven machines whereby the stitch-forming mechanism may be started and stopped at will.

My invention consists, essentially, in the combination, with the main shaft of the machine, it having upon it a fast fly or balance wheel provided with a clutch-face and a loose driver-pulley having a co-operating clutch-face, of a bevel-face lever mounted on a fulcrum parallel to the main shaft and shaped by its bevel-face to act upon and press the driver-pulley against the fly or balance wheel, a portion of the said lever at the opposite side of its fulcrum acting against the fly or balance wheel to stop its rotation when the beveled face of the lever is in position to let the driver-pulley run loose on the main shaft, as will be described.

Figure 1 is an end elevation of a sewing-machine embodying my invention, and Fig. 2 is a partial section on the line $x$. Fig. 3 is a detail.

The frame A, of any usual shape, has in it suitable bearings for the main shaft A', to which is fastened the fly or balance wheel A², the outer face of the said wheel having a friction or clutch face.

The shaft A' is extended sufficiently beyond the balance-wheel to receive a sleeve $a$, which is retained on the said shaft by a screw, $a'$, the said sleeve forming the bearing for a driver-pulley, B, having next the balance-wheel a friction or clutch face, $b$, the driver-pulley having a groove, as $b'$, for the reception of a driving-belt from any usual counter or driving shaft. The outer end of the hub of the pulley is provided with a plug, $b^2$, preferably of wood, against which acts the beveled face $c$ of the lever C, having its fulcrum, at $c'$ on a stud parallel to the shaft A' and located above the bed-plate of the machine, the said lever being so bent or shaped, substantially as shown, that its arm at that side of the fulcrum opposite that having the bevel-face is made to carry a brake-pad, $c^4$, preferably a plug of leather, wood, rawhide, or other equivalent substance. The hub of the lever C is adjustably secured by a set-screw, 3, to a sleeve, $d$, loose on the fulcrum $c'$, which is a stud-screw. As the bevel-face becomes worn, the hub may be adjusted longitudinally on the sleeeve $d$ to compensate for wear.

The lever C has attached to it a rod, D, which in practice is jointed to a treadle in usual manner, whereby the operator, with foot upon the treadle, may readily move the lever C in one or the other direction to cause the beveled face $c$ to act on the plug $b^2$ and force the rotating pulley B in driving contact with the balance-wheel to start the machine, or to remove the said bevel-face from its pressure on the plug and at the same time bring the brake against the balance-wheel to arrest its rotation and stop the machine quickly.

By pivoting the lever C on a fulcrum parallel to the shaft A' and above the bed-plate it is possible to accomplish what has heretofore required a lever having three arms, one arm being extended below the bed-plate parallel to the main shaft.

The lever C, shaped as shown, is very strong and compact.

I claim—

1. The main shaft, its attached fly or balance wheel, and the loose driver-pulley located at the side of the fly or balance wheel to be engaged with it, combined with a bent lever having a wedge-shaped end and a brake-surface and mounted on a pivot parallel to the said main shaft, to operate substantially as described.

2. The main shaft, the fly or balance wheel, and the loose pulley, and fulcrum-pin $c'$ and lever C, combined with the sleeve $d$, on which the said lever is made adjustable, substantially as described.

In testimony whereof I have signed my name to this specification in the presence of two subscribing witnesses.

WILBUR F. DIAL.

Witnesses:
 ISAAC HOLDEN,
 LOUIS H. BAKER.